United States Patent Office 3,664,620
Patented May 23, 1972

3,664,620
VIBRATION DAMPENING CLAMP FOR ELECTRICAL TRANSMISSION AND DISTRIBUTION LINES
Lonnie J. Branum, 2412 W. Stella Lane, Phoenix, Ariz. 85015
Filed Feb. 16, 1971, Ser. No. 115,629
Int. Cl. H02g 7/00; F16l 3/00; F16g 11/06
U.S. Cl. 248—63
5 Claims

ABSTRACT OF THE DISCLOSURE

A clamp for electric power lines employing a pair of cooperating jaws having clamping shoes mounted therein for movement laterally of the conductor, each shoe being spring biased into engagement with the conductor for balanced dampening action.

BACKGROUND OF THE INVENTION

This invention relates to transmission and distribution lines and more particularly to means for supporting cables from towers which will dampen and stabilize the lines over a wide range of vibration frequencies and amplitudes.

FIELD OF THE INVENTION

Frequency and amplitude vibrations or oscillations in aerial conductors whether wind or temperature induced have resulted in considerable damage to the distribution and transmission electric power lines. Violent oscillations often have caused contact between the conductors resulting in the tripping out of associated circuit breakers causing serious threats to continuity of service. In addition, conductors have broken even within the conductor clamps due to fatigue. Because of these problems and their serious consequences, detail study and research has been undertaken by the industry in the hope of finding a practical solution.

SUMMARY OF THE INVENTION

In accordance with the invention claimed a new and improved clamping device is provided for dampening vibrations on distribution and transmission lines whch additionally effectively eliminates or greatly reduces the breakage of the line conductors due to fatigue. Fatigue results even though the vibrations are greatly reduced since weather and temperature conditions constantly effect the stability of the conductors.

It is, therefore, one object of this invention to provide a new and improved vibration damper for distribution and transmission conductors.

Another object of this invention is to provide a new and improved electrical conductor clamp which effectively dampens line conductors over a wide range of vibration frequencies and amplitudes.

A further object of this invention is to provide an improved transmission line connector which greatly reduces wire fatigue due to oscillations induced by weather conditions.

A still further object of this invention is to provide a new and improved clamp for reducing oscillation and fatigue due to weather conditions which further controls corona around the connector.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawing in which.

DESCRIPTION OF PREFERRED EMBODIMENT

Figure 1:
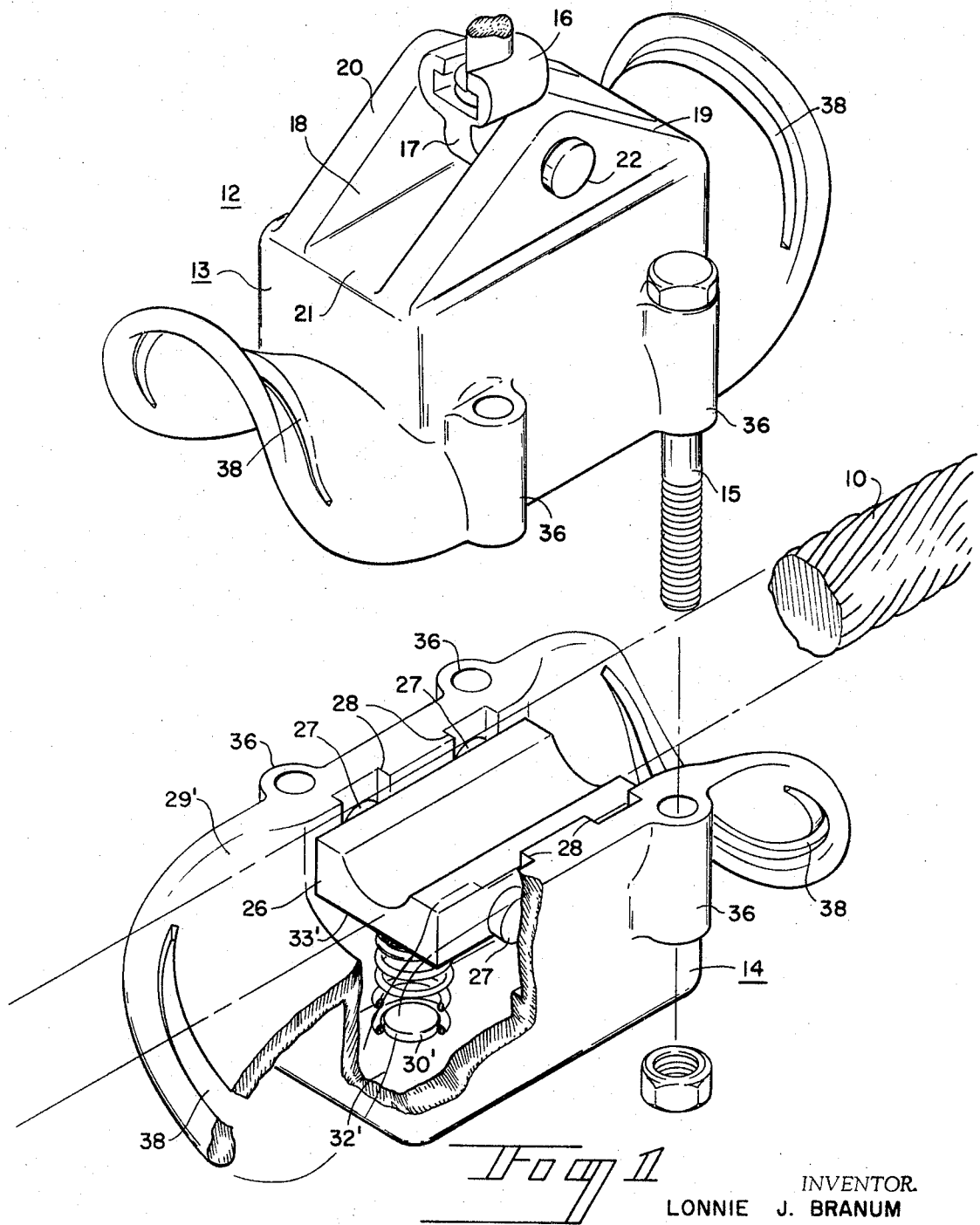
FIG. 1 is an exploded perspective view of the connector disclosed and embodying the invention.
Figure 2:
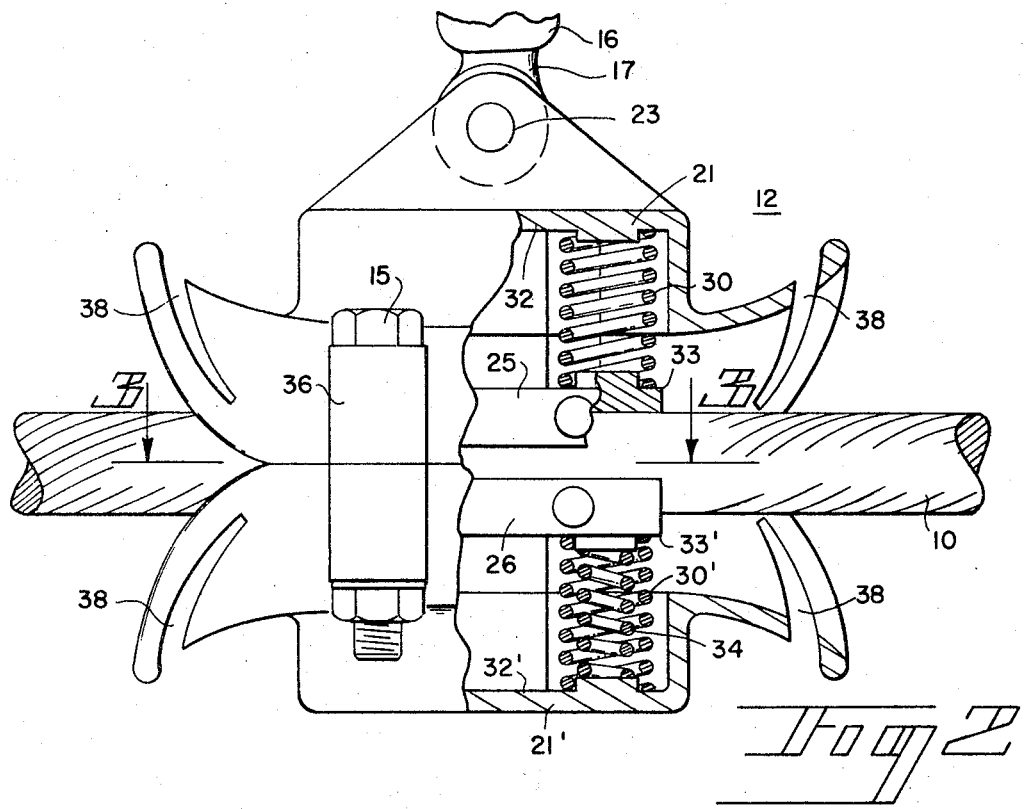
FIG. 2 is a side elevation of a clamp partly in section showing one form of the invention.
Figure 3:
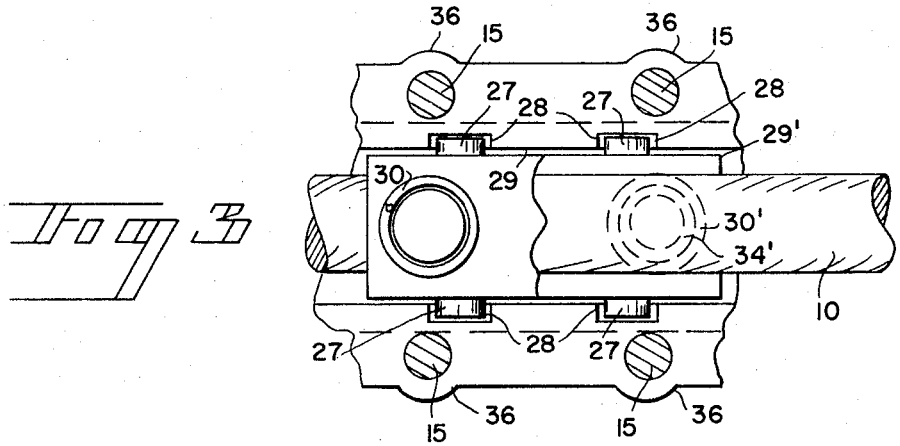
FIG. 3 is a cross sectional view of FIG. 2 taken along the line 3—3.

Referring more particularly to the drawings by characters of reference, FIGS. 1–3 disclose a clamp for supporting a distribution or high voltage transmission line or conductor 10 from a tower (not shown). The conductors are supported in long spans between supporting towers or poles wherein each tower, for example, may have vertically spaced cross arms projecting outwardly from the sides thereof. These cross arms have high voltage insulators suspended therefrom of the conventional and well known type. These suspension insulators are connected together by articulating joints, as is well known, and the length of each string of insulators is dependent upon the voltage effective upon conductor 10. The string of insulators is adapted to have supporting engagement with conductor 10 through a conductor clamp 12 comprising upper and lower clamping sections 13 and 14 adapted to be secured around the conductors by bolts 15.

The conductor clamp is hung from the suspension insulators through hanger means 16 preferably in the form of a pivoting mechanism. This mechanism comprises a downwardly facing flange 17 formed integral with or secured to the lower end of hanger means 16 extending downwardly from the lowermost insulator.

The flange 17 is fitted into a clevis 18 formed on the top of clamping section 13 as shown in FIGS. 1 and 2. Clevis 18 comprises a pair of arms 19 and 20 extending upwardly from the top 21 of clamping section 13 where it is pivotally mounted upon a pivot bolt 22. The head of bolt 22 bears against the outer face of arm 19 and the nut threaded on the bolt bears against the outside of arm 20 with the bolt extending through an aligned opening 23 in flange 17 in a well known manner.

The conductor clamp 12 is so designed to reduce the tight clamping effect of prior art clamps which under vibration conditions caused crystallization and serious damage to the conductor. Grpping the conductor tightly at a suspension clamp tends to concentrate the stress in the conductor with the resulting crystallization and ultimate failure of the conductor.

Where the grip of the conductor can be controlled or limited to low values, the danger of concentrating or setting up a maximum stress in the conductor is reduced. By means of the improved conductor clamp not only will the life of the conductor be lengthened by greatly reducing the vibration effects caused by weather conditions but a lighter weight clamp can be utilized.

In many cases the weight of the conductor in the seat of the clamp will be sufficient to maintain a good working condition. However, should the conductor vibrate or the downward thrust component on the conductor be rather small in the seat of the clamp due to a small sag or possible uplift, serious damage may result due to the conductor rubbing or beating against the seat of the clamp. For the above reasons it is generally advisable that some downward pressure be provided in addition to that provided by the weight of the conductor. This may be necessary to insure contact between the conductor and the clamp seat at the point of entrance to the clamp.

It is evident that a clamp having a single rigid seat which will be tangent to the incoming conductor for a large sag will not be in contact with the conductor at the point of entrance where the sag is reduced. Any vibration, therefore, under reduced sag will permit the conductor to beat against the clamp seat. If the clamp seat is made with a large radius of curvature so that there will be contact between the conductor at the point of entrance for small sags or angles of entrance, the conductor will be bent at the point of entrance where the sags are greater. It is therefore seen that it is a distinct advantage to maintain contact between the clamp seat and point of entrance of the conductor for all sags and at the same time provide a clamp which will permit of a large radius of curvature for the conductor at the point of support.

In my improved clamp means, contact is maintained at the point of entrance for all working positions of the conductor and in addition the radius of curvature depends upon the sag of the conductor. Where high tensions and small sag are used, the clamp automatically provides a long effective radius.

As shown in FIGS. 1-3 conductor 10 passes through clamping sections 13 and 14 which are held on the conductor by a pair of shoes 25 and 26 which are provided with laterally extending protrusions 27 which fit into guiding slots 28 in the inner surface 29, 29' of sections 13 and 14 as shown in FIGS. 1 and 2.

These shoes are spring biased laterally into engagement with conductor 10 by one or more springs 30, 30'. Each of these springs is positioned to extend between the inside surfaces 32, 32' of tops 21, 21' of sections 13 and 14 and the top surfaces 33, 33' of shoes 25 and 26. As shown the springs bias the shoes into tight clamping arrangement with conductor 10.

In order to compensate for extra downward force on conductor 10 by the weight and oscillating forces of the conductor, one or more springs 34 may be coaxially arranged within springs 30 or 30' to increase the biasing effect of the spring means.

As shown in FIGS. 1 and 2 the clamping section 13 and 14 are held together around conductor 10 by bolts 15 which extend through flanges 36 which form a part of sections 13 and 14. It should be recognized that any suitable clamping means for quickly and easily holding the clamping sections together can be utilized.

As readily noted from the drawings, the conductor clamp disclosed tightly grips the conductor but holds the conductor between a pair of shoes which are each resiliently biased so as to dampen oscillation of any amplitude in both upward and downward movements.

The ends of sections 13 and 14 are provided with slots 38 as shown in FIGS. 1 and 2.

The new disclosed clamp for power lines makes it feasible to eliminate the need for any outside cable support type shielding in the clamping zone. Additionally, since the new clamp provides damping effects, additional dampers heretofore used are not necessary.

Although but one embodiment of the present invention has been illustrated and described, it will be apparent to those skilled in the art that various changes and modifications may be made therein without departing from the spirit of the invention or from the scope of the appended claims.

I claim:

1. A clamp for supporting an electrical line conductor from a tower and for suppressing oscillations of the conductor under various weather conditions comprising,
   a pair of cooperating jaws for supporting therebetween the line conductor,
   each of said jaws being provided with a shoe movable laterally within said clamp and substantially perpendicular to a conductor be supported by the clamp for gripping the conductor,
   coil spring biasing means extending between each of said jaws and said shoe mounted therein for biasing the shoes into gripping contact with the conductor, and
   means attached to one of said jaws for pivotally attaching the clamp to the tower.

2. The clamp set forth in claim 1 wherein each of said jaws comprises,
   a body member for extending longitudinally along the conductor,
   each end of said body member being flared so that when said jaws cooperate to clamp on the conductor they form together nozzle-like structures at each end of the clamp.

3. The clamp set forth in claim 1 wherein each of said shoes comprises a rectangular member,
   each rectangular member having a first surface of arcuate configuration adjacent the conductor for surrounding at least a part of the conductor when in contact therewith, and a second surface opposite to said first surface for supporting one end of said coil spring biasing means,
   said coil spring biasing means extending between said second surface and said jaw for biasing said shoes into contact with the conductor.

4. The combination set forth in claim 1 wherein:
   each of said jaws comprises a body member for extending longitudinally along the conductor,
   each end of said body member being flared so that when said jaws cooperate to clamp down on the conductor they form together nozzle-like structures at each end of the clamp,
   each of said shoes comprising a rectangular member,
   each rectangular member having a first surface of arcuate configuration adjacent the conductor for surrounding at least a part of the conductor when in contact therewith, and a second surface opposite to said first surface for supporting one end of said coil spring biasing means,
   said coil spring biasing means extending between said second surface and said jaw for biasing said shoes into contact with the conductor.

5. The clamp set forth in claim 1 wherein the coil spring biasing means mounted in the lower half of the clamp comprises a pair of coaxially arranged springs for providing more rigidity than the coil spring biasing means mounted in the upper half of the clamp.

References Cited

UNITED STATES PATENTS

| | | | |
|---|---|---|---|
| 1,630,423 | 5/1927 | Gothberg | 174—150 |
| 1,783,543 | 12/1930 | Miller | 248—64 |
| 1,902,008 | 3/1933 | Austin | 174—42 UX |
| 2,497,820 | 2/1950 | Kielland | 24—115 G UX |
| 3,383,459 | 5/1968 | Short | 174—144 |

FOREIGN PATENTS

| | | | |
|---|---|---|---|
| 319,829 | 1/1970 | Sweden | 174—40 R |

LARAMIE E. ASKIN, Primary Examiner

U.S. Cl. X.R.

24—115 G, 125 R; 174—40 R, 42, 144